US007088540B2

(12) United States Patent
Suzuki et al.

(10) Patent No.: US 7,088,540 B2
(45) Date of Patent: *Aug. 8, 2006

(54) STORAGE APPARATUS AND CONTROL METHOD THEREFOR

(75) Inventors: Katsuyoshi Suzuki, Odawara (JP); Azuma Kano, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/198,464

(22) Filed: Aug. 4, 2005

(65) Prior Publication Data

US 2005/0270681 A1 Dec. 8, 2005

Related U.S. Application Data

(63) Continuation of application No. 10/461,292, filed on Jun. 13, 2003, now Pat. No. 6,950,263.

(30) Foreign Application Priority Data

Jun. 14, 2002 (JP) ............................. 2002-174948

(51) Int. Cl.
*G11B 19/02* (2006.01)

(52) U.S. Cl. ..................... 360/69; 713/320; 711/114

(58) Field of Classification Search ............... None
See application file for complete search history.

(56) References Cited

U.S. PATENT DOCUMENTS

| 5,251,320 | A | 10/1993 | Kuzawinski et al. |
| 5,652,892 | A | 7/1997 | Ugajin |
| 5,687,079 | A | 11/1997 | Bauer et al. |
| 5,754,870 | A | 5/1998 | Pollard et al. |
| 5,848,230 | A | 12/1998 | Walker |
| 5,848,282 | A | 12/1998 | Kang |
| 5,880,955 | A | 3/1999 | Matoba et al. |
| 6,182,232 | B1 | 1/2001 | Klein |
| 6,233,692 | B1 | 5/2001 | Villanueva |
| 6,317,839 | B1 | 11/2001 | Wells |
| 6,408,395 | B1 | 6/2002 | Sugahara et al. |
| 2002/0062454 | A1 | 5/2002 | Fung |
| 2002/0091953 | A1 | 7/2002 | Min |
| 2003/0223144 | A1 | 12/2003 | Smith et al. |

FOREIGN PATENT DOCUMENTS

| JP | 2001-339853 | 12/2001 |
| WO | WO 95/13581 | 5/1995 |

*Primary Examiner*—Andrew L. Sniezek
(74) *Attorney, Agent, or Firm*—Townsend and Townsend and Crew LLP

(57) ABSTRACT

A storage apparatus comprises at least one housing A in which a storage device and a controller are provided, at least one housing B in which a storage device and a peripheral device are provided, and a transmission path for connecting the storage device and the controller of the housing A, and the storage device of the housing B to enable communication therebetween. The storage apparatus is capable of controlling operation of the storage device of the housing B according to an operating state of the storage device of the housing A through communication via the transmission path; and controlling operation of the peripheral device according to an operating state of the storage device of the housing B.

20 Claims, 8 Drawing Sheets

| Basic housing 20 | | | Extension housing 30 | | |
|---|---|---|---|---|---|
| Main switch 75 | Disk drive 51 | Rotational speed of cooling fan 66 | Main disk drive 51 α | Sub-disk drive 51 β | Rotational speed of cooling fan 66 |
| ON | Ready | High | Ready | Ready | High |
| OFF | Power supply OFF | Stop | Not Ready | Power supply OFF | Low |

FIG. 7

STORAGE APPARATUS AND CONTROL METHOD THEREFOR

CROSS-REFERENCE TO RELATED APPLICATIONS

The present application claims priority upon Japanese Patent Application No. 2002-174948 filed Jun. 14, 2002, which is herein incorporated by reference.

BACKGROUND OF THE INVENTION

1. Field of the Invention

The present invention relates to a storage apparatus and a control method therefor.

2. Description of the Related Art

There are known disk array devices that have a configuration in which housings, each of which accommodating a plurality of disk drives, are mounted in several layers. Such disk array devices are called "rackmount" disk array devices. Japanese Patent Application Laid-open Publication No. 2001-339853 discloses a power supply method for such a type of disk array device. According to the method disclosed, a power-supply apparatus is provided outside the housing and connected to a basic housing and an extension housing by dedicated control lines for controlling power supplied to the housings in such a way that the power supplied to the extension housing is turned ON/OFF in an interlocked manner with the ON/OFF of the power supplied to the basic housing.

In such a disk array device, the power-supply apparatus must be provided outside the housing and, in addition, it is necessary to provide dedicated control lines therefor. For this reason, problems in miniaturization and cost arise. In order to solve these problems, another type of a disk array device is known in which only a minimum number of cables are provided as wires for mutually connecting the housings and those cables are used for transmitting read data and write data as well as for exchanging a variety of control signals. In addition, some of the disk array devices, which have a minimum number of cables as described above, are capable of keeping some of the components in the extension housings ON even while the power of the disk drives in the basic housing is OFF. Then, when the operation of the disk drives in the basic housing is started, the extension housings recognize that the disk drives in the basic housing have started to operate, and start to fully operate as well.

In a disk array device having such a configuration, while the power supplied to the disk drives of the basic housing is in an OFF state, in the extension housings, only the components required to recognize the start of the operation in the basic housing are kept ON. That is, the operation state of the extension housings is different from that of when the extension housings are ON. For example, the amount of heat dissipated by the various devices mounted on the extension housings when only the components for start recognition are operated is smaller than the amount of heat dissipated when the power of the extension housings is ON. Therefore, from power-saving and noise-reduction points of view, it is preferable to make peripheral devices mounted on the basic housing, such as cooling fans, to operate in a state that is appropriate to cool the dissipated heat.

SUMMARY OF THE INVENTION

An object of the present invention is to provide a storage apparatus and a storage apparatus control method enabling the storage apparatus to be controlled in a state desirable for power saving and noise reduction.

To achieve the above and other objects, one aspect of the present invention provides a method of controlling a storage apparatus. The storage apparatus includes: at least one housing A in which a storage device and a controller are provided; at least one housing B in which a storage device and a peripheral device are provided; and a transmission path for connecting the storage device and the controller of the housing A, and the storage device of the housing B to enable communication therebetween. The method comprises: controlling operation of the storage device of the housing B according to an operating state of the storage device of the housing A through communication via the transmission path; and controlling operation of the peripheral device according to an operating state of the storage device of the housing B.

Features and objects of the present invention other than the above will become clear by reading the description of the present specification with reference to the accompanying drawings.

According to the present invention, it becomes possible to, for example, control a storage apparatus in a preferable manner for saving power and reducing noise.

BRIEF DESCRIPTION OF THE DRAWINGS

Preferred embodiments of the present invention will now be described by referring to accompanying diagrams in which:

FIG. 7 is a diagram showing operating states of disk drives 51α, 51β and a cooling fan 66, which are employed in the disk array device according to the embodiment of the present invention, when the main switch 75 is turned ON and OFF; and FIG. 8 is a flowchart showing a sequence of processes carried out by the disk array device according to the embodiment of the present invention when the main switch 75 is turned ON.

DESCRIPTION OF THE PREFERRED EMBODIMENTS

Figure 1A:
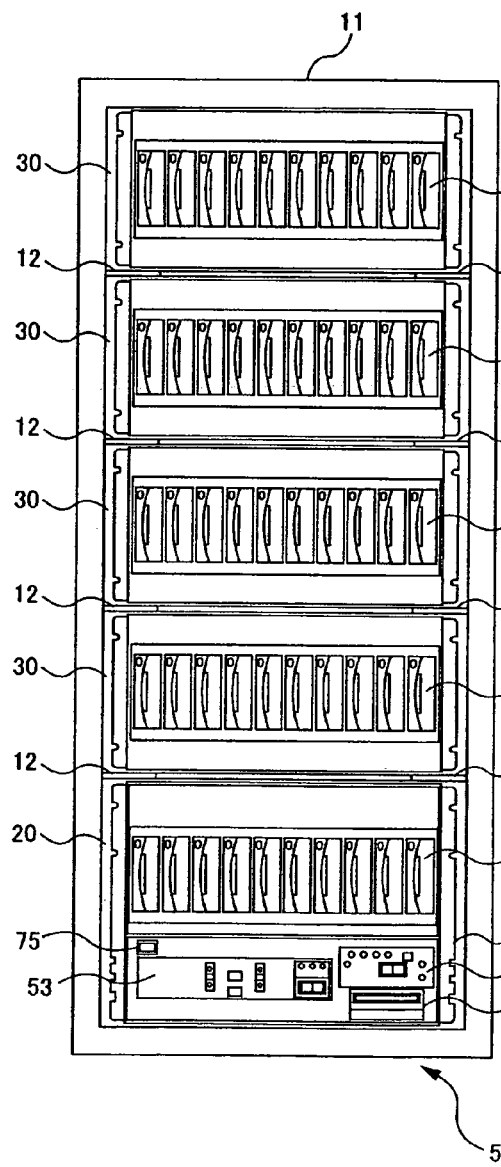
FIG. 1A is a front view of a disk array device 10 according to an embodiment of the present invention.

The preferred embodiments of the present invention are described in detail by referring to the accompanying diagrams below.

Outline of the Disclosure=

At least the following will be apparent in accordance with the present specification and accompanying drawings.

One aspect of the present invention is a method of controlling a storage apparatus. The storage apparatus includes: at least one housing A in which a storage device and a controller are provided; at least one housing B in which a storage device and a peripheral device are provided; and a transmission path for connecting the storage device and the controller of the housing A, and the storage device of the housing B to enable communication therebetween. The method comprises: controlling operation of the storage device of the housing B according to an operating state of the storage device of the housing A through communication via the transmission path; and controlling operation of the peripheral device according to an operating state of the storage device of the housing B.

An example of the storage apparatus is a disk array device having a configuration in which one or more housings are provided in a rack frame. The storage device cited above is, for example, a disk drive. The housings A and B are, for example, the basic and the extension housings respectively. An example of the peripheral device is a cooling device such as a cooling fan of the air cooling type for exhausting heat dissipated in the housing to the outside of the housing. An "operating state of a storage device" is, for example, ON and OFF states of a disk drive as well as the 'Ready', 'Not Ready' and 'Power Supply OFF' states to be described later. "Controlling operation of the peripheral device of the housing B" means, for example, to decrease the rotation speed of the cooling fan (which is an example of a peripheral device of the extension housing), or to decrease the number of cooling fans to be operated, which will be described later. The "communication via the transmission path" means, for example, communications through a later-described FC-AL loop 60 such as: communication between the disk drives 51 and the controller 71 accommodated in the basic housing 20; communication between the controller 71 in the basic housing 20 and main disk drives 51α or sub-disk drives 51β in the extension housing 30; and communication between the controller 71 in the basic housing 20 and a sub-controller 81 in the extension housing 30.

In the configuration described above, it is possible to, for example, make peripheral devices, such as cooling fans, operate in an appropriate manner for operating the storage device in the housing B when the power of the storage device of the housing A is turned OFF. Therefore, it becomes possible to control the storage apparatus in a preferable manner for saving power and reducing noise.

Apparatus Configuration

Figure 1B:
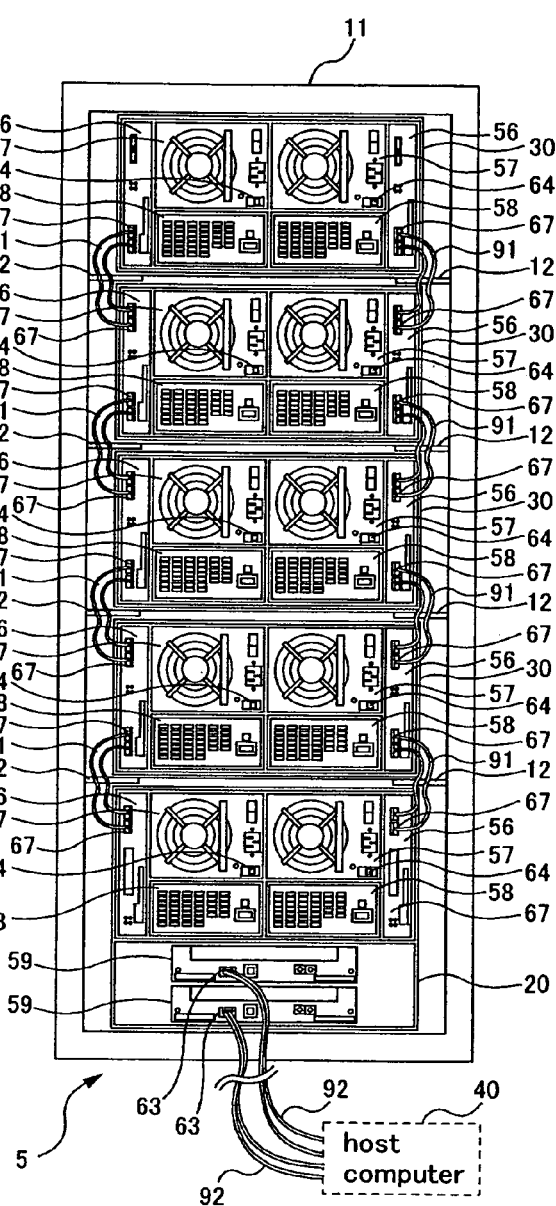
FIG. 1B is a rear view of the disk array device 10.
Figure 2A:
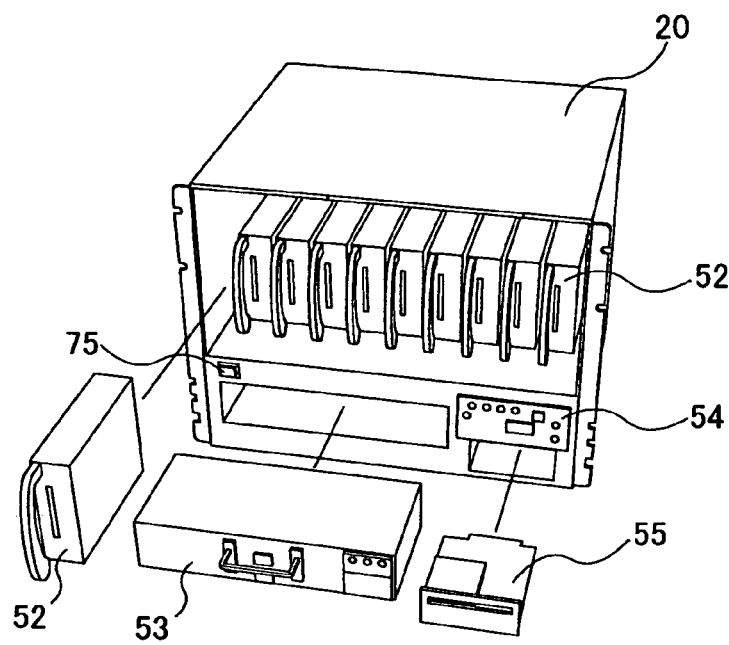
FIG. 2A is a perspective view of a basic housing 20, which is mounted on the disk array device 10 according to the embodiment of the present invention, as seen from the front thereof.
Figure 2B:
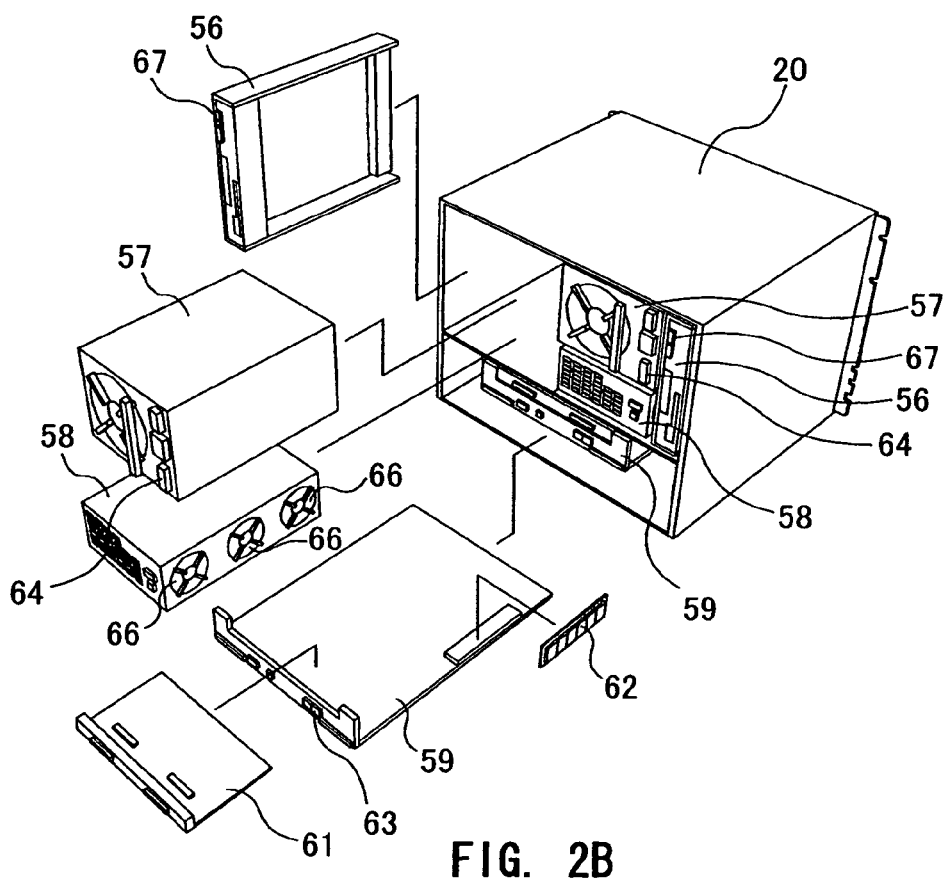
FIG. 2B is a perspective view of the basic housing 20 as seen from behind.
Figure 3A:
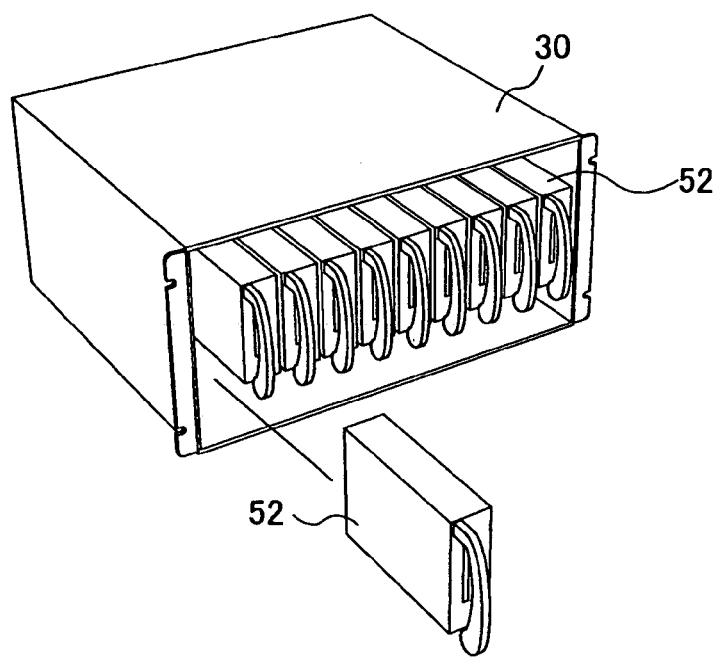
FIG. 3A is a perspective view of an extension housing 30, which is also mounted on the disk array device 10 according to the embodiment of the present invention, as seen from the front thereof.
Figure 3B:
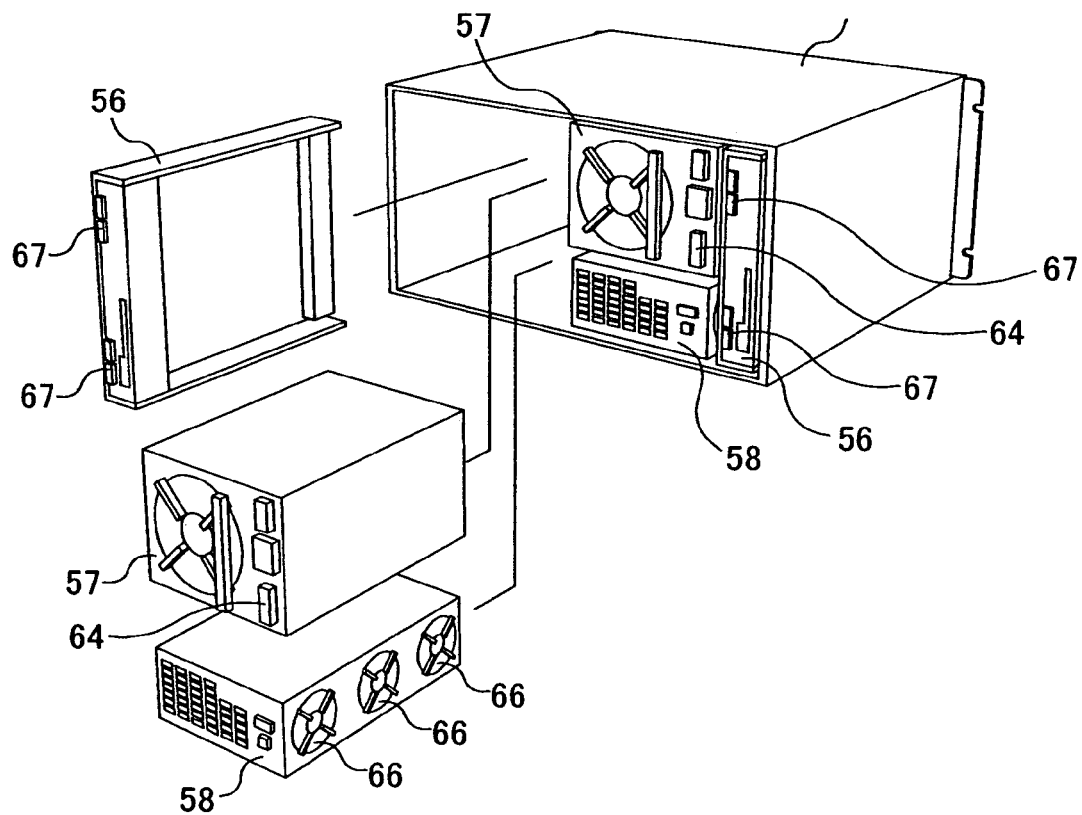
FIG. 3B is a perspective view of the extension housing 30 as seen from behind.

FIG. 1A is a front view of a disk array device 10 according to an embodiment of the present invention, and FIG. 1B is a rear view of the disk array device 10. FIG. 2A is a perspective view of a basic housing 20, which is mounted on the disk array device 10, as seen from the front thereof, and FIG. 2B is a perspective view of the basic housing 20 as seen from behind. FIG. 3A is a perspective view of an extension housing 30, which is also mounted on the disk array device 10, as seen from the front thereof, and FIG. 3B is a perspective view of the extension housing 30 as seen from behind.

As shown in FIGS. 1A and 1B, the disk array device 10 has a configuration based on a rack frame 11. The rack frame 11 has a plurality of stages of mount frames 12 in the vertical direction and on both the right and left side surfaces inside the rack frame 11. The mount frames 12 are oriented in the horizontal direction from the rear of the rack frame 11 to the front thereof. The basic housing 20 or the extension housing 30 is placed on the mount frames 12 like a drawer. As shown in FIGS. 2A, 2B, 3A, and 3B, the basic housing 20 or the extension housing 30 have various boards and units for implementing a variety of functions of the disk array device 10.

As shown in FIG. 2A, on the upper section of the front of the basic housing 20, a plurality of disk-drive units 52 are lined up. Each of the disk-drive units 52 includes a disk drive 51.

On the lower section of the front of the basic housing 20, there are mounted a battery unit 53, a display panel 54 for displaying, for example, the operation state of the disk drives 51, and a flexible-disk drive 55. The battery unit 53 has inside a secondary battery. The battery unit 53 serves as a backup power supply, which is used for supplying power to the boards and the units when the supply of power from an AC/DC power supply 57 is cut off due to power failure or the like. The display panel 54 has display devices such as LED lamps that are used for displaying the operation state of the disk drives 51 or the like. The flexible-disk drive 55 is used, for example, to load a maintenance program.

As shown in FIG. 2B, on the upper level of the rear on each side of the basic housing 20, a sub-controller board 56 is provided. The sub-controller board 56 has: a PBC (Port Bypass Circuit) 50 (not shown in this figure) for controlling an FC-AL loop (Fibre Channel Arbitrated Loop) 60 formed between the disk drives 51; and circuits for monitoring the state of the AC/DC power supply 57, monitoring the states of the disk drives 51, controlling the display devices on the display panel 54, monitoring the temperature of each component in the housing, and for various other purposes. The sub-controller board 56 also includes a Fibre Channel-cable connector 67. To the connector 67 is connected a Fibre Channel cable 91, which is part of the route of the FC-AL loop 60. It is to be noted that details of the FC-AL loop 60 are described in documents such as "Description of Fibre Channel Technology" (Fibre Channel Industry Association Japan, published: Ronsosha), Japanese Patent Application Laid-open Publication No. 2001-167040, Japanese Patent Application Laid-open Publication No. 2001-337868, and Japanese Patent Application Laid-open Publication No. 2001-222385.

As shown in FIG. 2B, in a space between the two sub-controller boards 56 provided on the upper level of the rear on both sides of the basic housing 20, two AC/DC power supplies 57 are mounted next to each other. The AC/DC power supplies 57 supply power to the boards and the units. It is to be noted that each of the basic housing 20 and the extension housing 30 is provided with two AC/DC power supplies 57 in order to assure security of power supply for the basic housing 20 and the extension housing 30. The AC/DC power supply 57 has a breaker switch 64 for turning the output of the AC/DC power supply 57 ON and OFF.

As shown in FIG. 2B, beneath the AC/DC power supplies 57, two cooling fan units 58 of the air cooling type are arranged next to each other. The cooling fan unit 58 has at least one cooling fan 66. By blowing air into and out of the housing, the cooling fan 66 exhausts heat dissipated by components, such as the disk drives 51 and the AC/DC power supply 57, to the outside of the housing. It is to be noted that air paths and air holes are formed on each of the basic housing 20, the extension housing 30, the boards, and the units for allowing air to be circulated inside the basic housing 20 and the extension housing 30, thus enabling the cooling fans 66 to efficiently exhaust heat from the insides of the basic housing 20 and the extension housing 30 to the outside. The cooling fan unit 58 is connected to a controller board 59 or a sub-controller board 56 by a control line 48 so that the controller board 59 or the sub-controller board 56 is capable of controlling the rotation speed (number of rotations) of the cooling fan 66 employed in the cooling fan unit 58 through the control line 48.

As shown in FIG. 2B, on the lower level of the rear of the basic housing 20, two controller boards 59 are mounted in the vertical direction. The controller board 59 has, for example: a communication interface between the disk drives 51α and 51β mounted on the basic housing 20 and the extension housing 30, respectively; circuit(s) for controlling the operations of the disk drives 51 (for example, according to RAID control) and for monitoring the states of the disk drives 51; a communication interface board 61 for providing a communication function conforming to, for example, SCSI or Fibre Channel specifications in order to provide functions as a communication interface with the host computer 40; and a cache memory 62 for storing data to be written into a disk drive 51 and data read out from a disk drive 51. The communication interface board 61 mounted on the controller board 59 has an external connector 63 conforming to predetermined interface specifications such as the SCSI specifications or specifications of a LAN for connecting to the host computer 40 and built in compliance with a protocol such as the Fibre Channel or Ethernet protocol. The disk array device 10 is connected to the host computer 40 by a communication cable 92 connected to this external connector 63.

As shown in FIG. 3A, on the front-surface side of the extension housing 30, a plurality of disk-drive units 52 are arranged next to each other. Each of the disk-drive units 52 includes a disk drive 51. As shown in FIG. 3B, on each side of the rear of the extension housing 30, a sub-controller board 56 is provided. In addition, in a space between the two sub-controller boards 56 provided on the rear on each side of the extension housing 30, two AC/DC power supplies 57 are arranged next to each other. Furthermore, beneath the AC/DC power supplies 57, two cooling fan units 58 are arranged next to each other.

Figure 4:
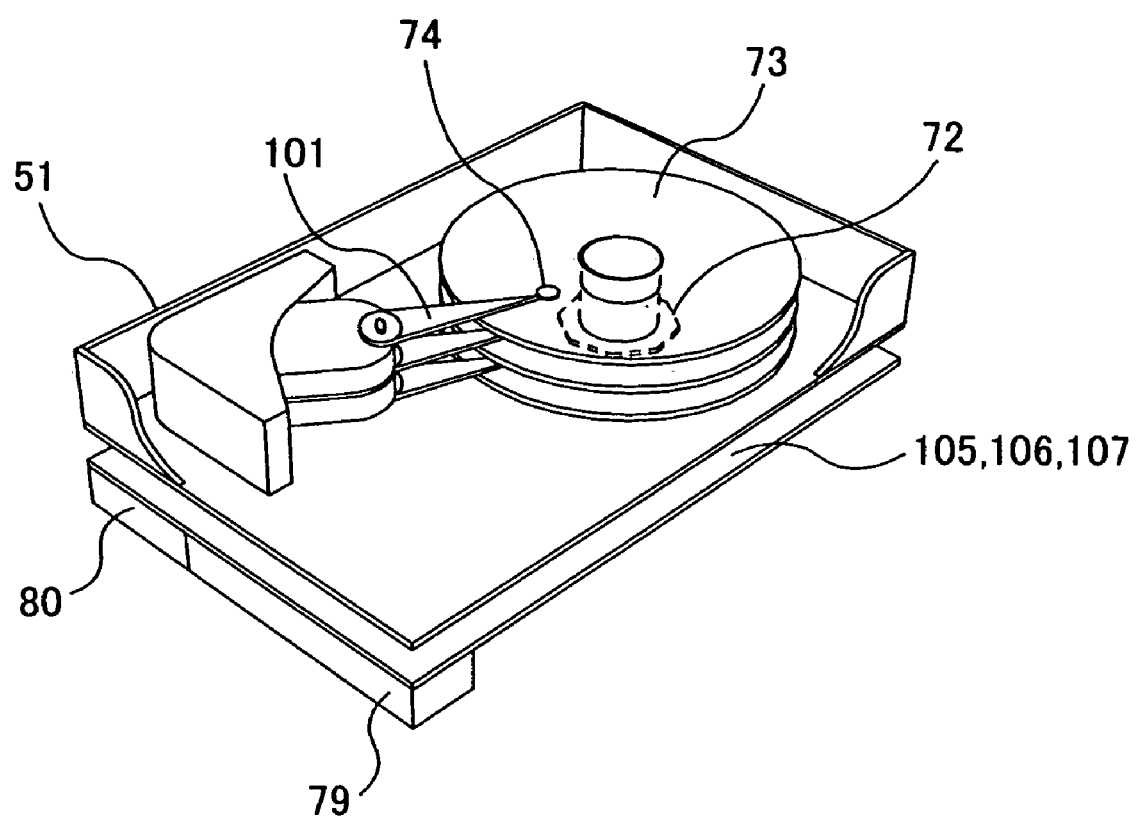
FIG. 4 is a diagram showing a configuration of a disk drive 51 mounted on a disk-drive unit 52 according to the embodiment of the present invention.

FIG. 4 is a diagram showing a typical configuration of a disk drive 51 mounted in a disk-drive unit 52. The disk drive 51 is an ordinary disk drive of the 3.5-inch type employed in a commonly known general personal computer. The disk drive 51 has, for example: mechanical parts, such as an actuator 101, a spindle motor 72, a disk 73, and a head 74 for reading and writing data; a mechanism control circuit 105 for controlling the mechanical parts; a signal-processing circuit 106 for controlling a read/write signal supplied to the disk 73; a communication-interface circuit 107; an interface connector 79 through which various commands and data to be written/read to/from the disk 73 are input/output; and a power-supply connector 80.

<Circuit Configuration>

Figure 5:
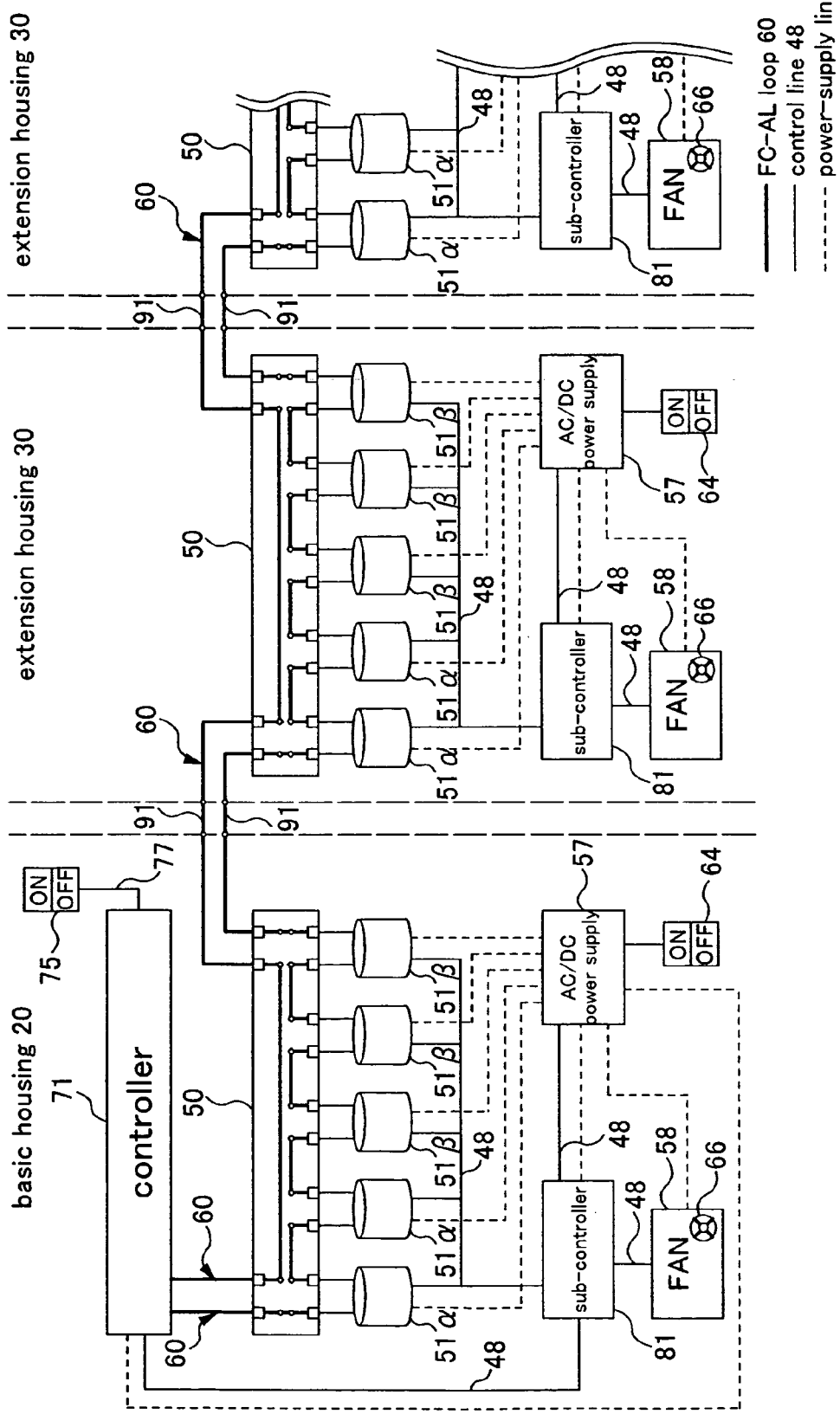
FIG. 5 is a diagram showing a circuit configuration of the disk array device according to the embodiment of the present invention.

With the basic housing 20 and the extension housing(s) 30 mounted in the rack frame 11, the boards and the units mounted on the housings 20 and 30 are connected to each other by, for example, internal wires, internal circuits, and external wires to form a circuit shown in FIG. 5. The internal wires, the internal circuits, and the external wires are mounted on the rack frame 11 but not shown in the figures. In FIG. 5, a thick line represents the FC-AL loop 60, a thin line represents a control line 48, and a dashed line represents a power-supply line 49. The controller 71 is a circuit comprising components such as a CPU, a protocol control chip, and a memory such as a RAM and a ROM. The components of the controller 71 are mounted on the controller board 59. The controller 71 carries out functions such as a function to communicate with the host computer 40 and functions to control and monitor the disk drives 51α and 51β respectively mounted on the basic housing 20 and the extension housing 30.

A main switch 75 is provided, for example, on the front surface of the basic housing 20 in such a way that, for example, when the controller board 59 is mounted on the basic housing 20, an output signal line 77 of the main switch 75 is connected to the controller 71. It is to be noted that the main switch 75 can also be provided on the rack frame 11. In this case, the system can be configured so that, when the basic housing 20 is mounted on the rack frame 11, the output signal line 77 of the main switch 75 is connected to the controller 71.

One reason why the main switch 75 is provided as a switch separate from the breaker switch 64 of the AC/DC power supply 57 is to eliminate the need to carry out burdensome manual operations. For example, if the breaker switches 64 of all of the AC/DC power supplies 57 of the basic housing 20 and the extension housing 30 are turned OFF, not only the AC/DC power supply 57 of the basic housing 20 but also the AC/DC power supplies 57 of the extension housings 20 have to be turned ON in order to restart the disk array device 10. Further, before turning the breaker switch 64 of the basic housing 20 ON, it would be necessary to first turn the breaker switches 64 of the extension housings 30 ON in advance and confirm that all of the disk drives 51 mounted on the extension housings 30 have started operating. By providing the main switch 75 as a switch separate from the breaker switch 64, in case, for example, the disk array device 10 is to be restarted in a relatively short period of time, it becomes possible to restart the disk array device 10 by turning only the main switch 75 OFF, without turning the breaker switches 64 OFF, and then turning the main switch 75 ON according to a mechanism described later.

Furthermore, the main switch 75 is also for providing an opportunity to perform so-called destaging, which is a process for storing, onto the disk 73, data unwritten to the disk drive 51 and left in the cache memory 62, when turning the disk array device 10 completely OFF by turning OFF the breaker switch 64. For example, when the operator or the like intends to stop the operation of the disk array device 10, the operator first turns off the main switch 75 before turning off the breaker switch 64. Detecting that the main switch 75 has been turned OFF, the controller 71 destages data left in the cache memory 62 and unwritten to the disk 73. Then, after destaging of the unwritten data is completed, the controller 71 displays a message indicating the completion of the de-stage operation on the display panel 54. Informed by the message that destaging has been completed, the operator turns off the breaker switch 64 to stop the operation of the disk array device 10. It is to be noted that, in order to restart the disk array device 10, the operator needs to turn on the breaker switch 64 first before turning on the main switch 75.

In addition, the controller 71 is also capable of performing control corresponding to the ON/OFF operations of the main switch 75 using software. For example, the controller 71 is capable of performing control corresponding to the ON/OFF operations of the main switch 75 in remote control based, for example, on a signal input from the external connector 63. In the case of a configuration in which only the breaker switch 64 is used without employing the main switch 75, when the breaker switch 64 is turned off, all power supplied to the disk array device 10 is cut off inevitably, making it impossible to receive an ON/OFF signal from an external source and, hence, impossible to execute the remote control. It is therefore necessary to provide the main switch 75 in order to enable ON/OFF operation control using software.

The PBC 50 mainly provides a function to interconnect the disk drives 51 and the controller 71, which are accommodated in the basic housing 20 and/or the extension housings 30, by using the FC-AL loop 60. It is to be noted that the circuit board of the PBC 50 is provided in the rack frame 11 of the disk array device 10 or, as an alternative, some or all of the circuit board may be mounted on the controller board 59 and/or the sub-controller board 56.

As described above, the PBC 50 mainly functions to connect the disk drives 51 and the controller 71 to each other via the FC-AL loop 60. In addition, the PBC 50 also plays the role of disconnecting a failed disk drive 51 from the FC-AL loop 60 and, when a new disk drive 51 is mounted, incorporating that new disk drive 51 to the FC-AL loop 60.

A sub-controller 81 is mounted on the sub-controller board 56. The sub-controller 81 is configured from, for example, a CPU, a memory such as a RAM and a ROM, as well as a variety of other control chips. The sub-controller 81 has control lines 48 that are connected to the cooling fan unit 58 and the AC/DC power supply 57. The sub-controller 81 controls and monitors the boards and the units, such as the cooling fan units 58, the AC/DC power supplies 57, and the disk drives 51, mounted on the basic housing 20 and the extension housing 30.

Description of Operations

<Operating States of the Disk Drive>

Receiving a command from the controller 71, the disk drive 51 enters a 'Ready', 'Not Ready' or 'Power Supply OFF' operating state. The disk drive 51 operating in the 'Ready' state is capable of further receiving a data-read or data-write command issued by the controller 71. The disk 73 mounted in the disk drive 51 operating in the 'Ready' state is rotating at a rotation speed required for an operation to read out or write data from or into the disk 73. The state of rotating at such a rotation speed is referred to as a "spin-up state" of the disk 73. It is to be noted that an average power consumption of the disk drive 51 in the 'Ready' state is the greatest among the three states mentioned above.

When the disk drive 51 is operating in the 'Not Ready' state, the disk 73 of that disk drive 51 is not rotating at the rotation speed required to read out or write data from or into the disk 73. That is to say, the disk 73 is in a "spin-down state". It is to be noted that the disk drive 51 operating in the 'Not Ready' state cannot receive a command to read out or write data from or onto the disk 73; however, it can accept commands of a specific type such as a command for making the disk drive 51 change to the 'Ready' state. Note that the average power consumption of the disk drive 51 in the 'Not Ready', operating state is smaller than the average power consumption of the disk drive 51 in the 'Ready' operating state.

When the disk drive 51 is operating in the 'Power Supply OFF' state, the disk drive 51 is not capable of receiving a command issued by the controller 71. In addition, the rotation of the disk 73 mounted on the disk drive 51 is completely stopped. It is to be noted that the average power consumption of the disk drive 51 in the 'Power Supply OFF' operating state is zero.

The disk drive 51 is also provided with SES (SCSI Enclosure Service) and ESI (Enclosure Service I/F) functions, which are prescribed in SCSI-3 (Small Computer System Interface 3) specifications. By wiring predetermined signal pins of the interface connector 79, the SES (SCSI Service) and ESI (Enclosure Service I/F) functions can be operated. It is to be noted that, in the following description, a disk drive 51 carrying out these functions is referred to as a main disk drive 51α while a disk drive 51 not carrying out these functions is referred to as a sub-disk drive 51β.

<Basic Operations of the Disk array device>

The controller 71 can determine whether each of the disk drives 51 is in the 'Ready', 'Not Ready' or 'Power Supply OFF' operating state by communicating with disk drives 51 mounted on the basic housing 20 and the extension housing 30 through the FC-AL loop 60. In addition, the controller 71 transmits a command to a disk drive 51 to control the operation of the disk drive 51. It is to be noted that communications for detecting the operating states and for operation control are carried out in accordance with a protocol such as FC-AL or the Fibre Channel protocol for SCSI.

<Turning the Main Switch OFF>

With reference to a flowchart shown in FIG. 6, a sequence of processes carried out by the disk array device 10 having the configuration described above when the main switch 75 is turned OFF will be described below.

First of all, it is assumed that the breaker switches 64 of all the AC/DC power supplies 57 mounted on the basic housing 20 and the extension housing 30 are in an ON state while the main switch 75 is in an ON state, and thus all the power supplies of the disk drives 51 mounted on the basic housing 20 and the extension housing 30 are ON.

Figure 6:
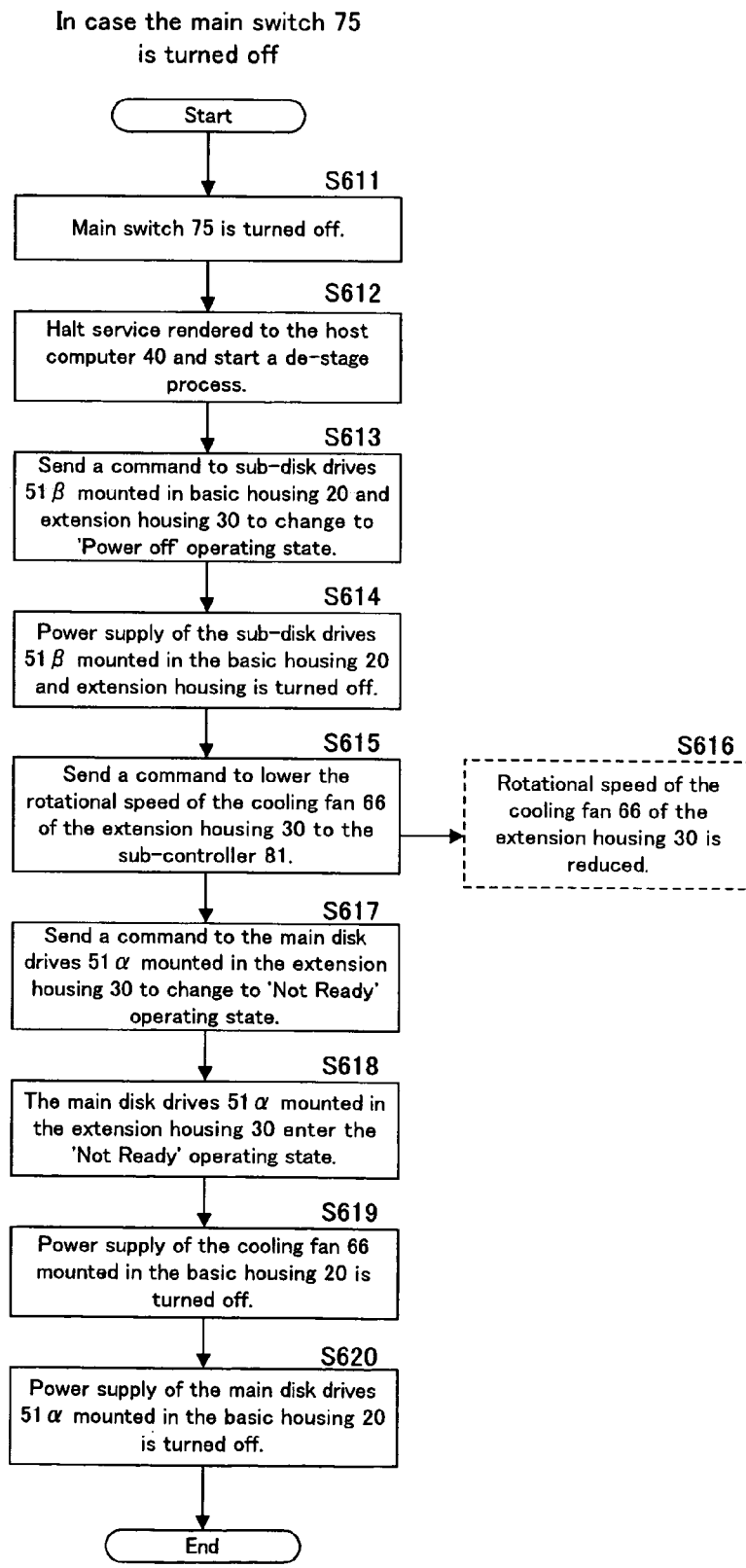
FIG. 6 is a flowchart showing a sequence of processes carried out by the disk array device according to the embodiment of the present invention when a main switch 75 is turned OFF.

In this state, the operator or the like turns off the main switch 75 at step S611 of the flowchart shown in FIG. 6. When detecting this operation to turn off the main switch 75, the controller 71 halts the service for the host computer 40 and starts a destaging process of unwritten data left in the cache memory 62 at step S612. After the destage process is completed, the controller 71 sends a command to sub-disk drives 51β mounted in the basic housing 20 and the extension housing 30 through the FC-AL loop 60 at step S613, requesting the sub-disk drives 51β to make a transition from the 'Ready' operating state to the 'Power Supply OFF' operating state. As a result, the sub-disk drives 51β mounted in the basic housing 20 and the extension housing 30 enter the 'Power Supply OFF' operating state at step S614.

The controller 71 is monitoring the operating state of each disk drive 51 mounted in the basic housing 20 and the extension housing 30 by sending out an inquiry to each of the disk drives 51 through the FC-AL loop 60 (such as by polling). When the controller 71 detects that a sub-disk drive 51β mounted in a certain extension housing 30 has made a transition to the 'Power Supply OFF' operating state, the controller 71 sends, to the sub-controller 81 of the extension housing 30 via the FC-AL loop 60, a command to lower the rotation speed of the cooling fan 66 employed in the cooling-fan unit 58 mounted in the relevant extension housing 30 at step S615. Receiving the command, the sub-controller 81 reduces the rotation speed of the cooling fan 66 by, for example, lowering a driving voltage applied to the cooling fan 66 at step S616.

On the other hand, at step S617, the controller 71 sends a command to the main disk drives 51α mounted in the extension housing 30 in the rack frame 11 through the FC-AL loop 60, requesting the main disk drives 51α to make a transition to the 'Not Ready' operating state. As a result, the main disk drives 51α mounted in the extension housing 30 enter the 'Not Ready' operating state at step S618.

In this state, power is supplied to the sub-controller board 56 in each extension housing 30, and therefore, the sub-controller 81 is capable of continuing its function. In addition, as described above, in the 'Not Ready' operating state, the main disk drive 51α do not accept data-read commands or data-write commands; however, they accept some specific commands such as a command for instructing transition from one of the above-mentioned operating state to another operating state. In addition, by making the main disk drives 51α operate in the 'Not Ready' operating state, the power consumption of the main disk drives 51α becomes smaller in comparison with that in the 'Ready' operating state. Furthermore, since the operations of the sub-disk drives 51β are also halted, the overall power consumption of the disk array device 10 becomes extremely small.

It is to be noted that in order to perform the control processes mentioned above, for example, the sub-disk drive 51β can send, to the cooling-fan unit 58a, a command instructing to lower the rotation speed, and an MPU mounted on the cooling-fan unit 58 can actually perform the control. The rotation speed of the cooling fan 66 is reduced to a value appropriate for the operating state of the disk drives 51. In this embodiment, for example, 2 main disk drives 51α are operating in the 'Not Ready', state while the sub-disk drives 51β are operating in a 'Power Supply OFF' state. In this case, the rotation speed of the cooling fan 66 is reduced to a value appropriate for exhausting heat dissipated by the disk drives 51 operating in such states. It is to be noted that the main disk drives 51α and the sub-disk drive 51β may not change to the 'Not Ready', and 'Power Supply OFF' state synchronously; instead, they may change to the 'Power Supply OFF' state with a difference in time. In view of such a situation, the system can be configured so that the controller 71 or the sub-controller 81 in the extension housing 30 or the like monitors the operating states of the main disk drives 51α and the sub-disk drive 51β on a real-time basis or at short time intervals so as to precisely control the rotation speed of the cooling fan 66 in accordance with the operating states of the main disk drives 51α and the sub-disk drive 51β, which change from time to time. In addition, it is also possible to provide a configuration in which an optimum rotation speed is automatically set in accordance with a temperature detected by a sensor or the like.

Then, at step S619, the controller 71 controls the sub-controller 81 in the basic housing 20 through the control line 48 to halt the rotation of the cooling fan 66 in the basic housing 20. Then, at step S620, the controller 71 causes the main disk drives 51α mounted in the main housing 20 to make a transition to the 'Power Supply OFF' operating state. In this way, the sequence of processes carried out when the main switch 75 is turned OFF is completed.

FIG. 7 is a diagram showing operating states of the disk drives 51α, 51β and the cooling fan 66, which are incorporated in the basic housing 20 and the extension housing 30, according to the state of the main switch 75.

When the main switch 75 is ON, all the disk drives 51α and 51β incorporated in the basic housing 20 and the extension housing 30 are operating in the 'Ready' state. The cooling fan 66 is driven at a high rotation speed required for exhausting heat generated in the basic housing 20 and the extension housing 30 in this operating state.

When the main switch 75 is OFF, on the other hand, the power supplies of all the disk drives 51α and 51β incorporated in the basic housing 20 are turned off. As for the extension housing 30, the power supply of the sub-disk drive 51β is turned off, and only the main disk drive 51α is operating in the 'Not Ready' state. The cooling fan 66 is driven at a rotation speed required for exhausting heat generated in this operating state. This rotation speed is lower than the rotation speed when the main switch 75 is ON. That is to say, when the main switch 75 is OFF, the cooling fan 66 of the extension housing 30 is driven at a rotation speed lower than the rotation speed when the main switch 75 is ON; therefore, power saving and noise reduction can be accomplished.

It is to be noted that, in the above description, the rotation speed of the cooling fan 66 is controlled in accordance with the operating state of the disk drives 51 in order to save energy and reduce noises. However, it is also possible to provide a configuration in which, for example, the sub-controllers 81 control the AC/DC power supplies 57 in accordance with the operating states of the disk drives 51 to adjust the number of operating cooling fans 66 in order to save energy and reduce noises as well.

<Turning the Main Switch ON>

With reference to a flowchart shown in FIG. 8, description will be made of a sequence of processes carried out by the disk array device 10 having the configuration described above when the main switch 75 is turned ON again after being once turned OFF with the breaker switch 64 turned ON.

Figure 8:
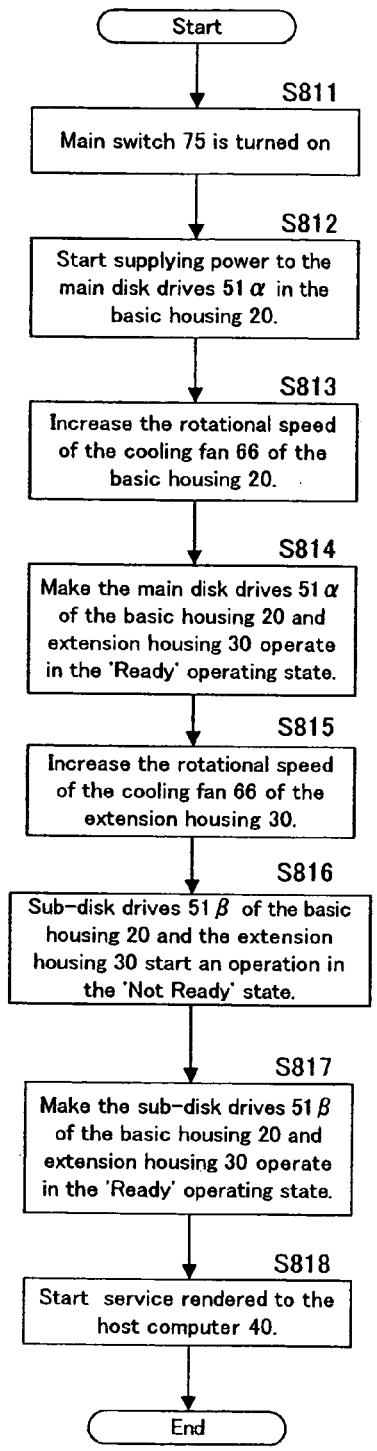

When the controller 71 detects that the main switch 75 has been turned ON at step S811 of the flowchart shown in FIG. 8, the controller 71 controls the sub-controller 81 of the basic housing 20 through the control line 48 to start an operation to supply power to the main disk drives 51α in the basic housing 20 at step S812. At step S813, the controller 71 also controls the sub-controller 81 of the basic housing 20 through the control line 48 to start making the cooling fan 66 of the basic housing 20 to rotate at a required rotation speed. Further, at step S814, the controller 71 sends a command to the main disk drives 51α in the basic housing 20 and the extension housing 30 through the FC-AL loop 60, requesting the main disk drives 51α to make a transition to the 'Ready' operating state. As a result, the main disk drives 51α in the basic housing 20 make the transition to the 'Ready' operating state.

Then, the controller 71 sends a command to the sub-controller 81 in the extension housing 30 through the FC-AL loop 60, requesting the sub-controller 81 to raise the rotation speed of the cooling fan 66. Receiving this command, the sub-controller 81 increases the rotation speed of the cooling fan 66 at step S815. It is to be noted that, at this stage, the rotation speed of the cooling fan 66 can be increased in advance to a value required for exhausting heat that will be dissipated when all the disk drives 51α and 51β incorporated in the extension housing 30 are put in the 'Ready', operating state. In this way, it is possible to prevent the sub-disk drives 51β from making a transition to the 'Ready', operating state faster than the rise of the rotation speed of the cooling fan 66 and, hence, to prevent the temperature in the housing from increasing. Instead, the rotation speed of the cooling fan 66 can be gradually increased in accordance with the state of transition of each of the main disk drives 51α and/or the sub-disk drives 51β. As an alternative, instead of varying the rotation speed of the cooling fan 66, the number of operating cooling fans 66 can be adjusted. In this case, the number of operating cooling fans 66 can be gradually increased in accordance with the state of transition of each of the main disk drives 51α and/or the sub-disk drives 51β. As described above, by making the cooling fan 66 rotate in a state that is appropriate for the operation state at different times, it becomes possible to save energy and reduce noises effectively.

Then, the controller 71 sends a command to the sub-controllers 81 in the main housing 20 and the extension housing 30 through the FC-AL loop 60 and the control line 48, requesting the sub-controllers 81 to start supplying power to the sub-disk drives 51β. Receiving this command, at step S816, the sub-controllers 81 in the main housing 20 and the extension housing 30 control the AC/DC power supplies 57 to start supplying power to the sub-disk drives 51β that they are in charge of. In this way, each of the sub-disk drives 51β starts operating in the 'Not Ready' state.

By sending an inquiry through the FC-AL loop 60, for example, the controller 71 is capable of detecting the start of the operation of each sub-disk drive 51β in the main housing 20 and the extension housing 30. When the start of the operation of each sub-disk drive 51β is detected, the controller 71 sends a command to each sub-disk drive 51β in the main housing 20 and the extension housing 30 through the FC-AL loop 60, requesting the sub-disk drive 51β to make a transition to the 'Ready' operating state. Receiving the command, the sub-disk drive 51β starts operating in the 'Ready' operating state, and thus gets connected to the FC-AL loop 60 at step S817.

As described above, all of the disk drives 51α and 51β in the main housing 20 and the extension housing 30 start to operate in the 'Ready' state in which data can be read out from and written onto a disk 73. Then, when the controller 71 detects the start of the operation of each of the disk drives 51α and 51β in the main housing 20 and the extension housing 30 by, for example, sending an inquiry through the FC-AL loop 60 to each of the disk drives 51α and 51β, at step S818, the controller 71 starts service for the host computer 40 by carrying out preparatory processes such as starting required software.

Other Embodiments

It is not necessary to carry out the various functions of the controller 71 and the sub-controller 81 in the ways described above. The various functions can be implemented on either the controller 71 or the sub-controller 81; further, it is also possible to change the configuration for implementing the functions freely according to various circumstances.

The cooling device mounted in the basic housing 20 or the extension housing 30 does not have to be the cooling fan unit 58 described above. Instead, the cooling device can also be a cooling means of another type. For example, the cooling device can be a water-cooled cooling device or a cooling device employing a Peltier device.

The present invention can be applied not only to disk array devices, but also to storage apparatuses using, for example, semiconductor disks, instead of the disk drives, as storage devices.

We claim:

1. A method of controlling a storage apparatus, the storage apparatus including at least one housing A in which a storage device and a controller are provided, at least one housing B in which another storage device and a cooling device are provided, the storage device in the housing B including a plurality of storage units; and a transmission path connecting the storage device and the controller of the housing A and the storage device of the housing B to enable communication therebetween;

the method comprising:

if one or more storage units of the storage device in the housing B are in a "power supply off" state wherein power supply to the one or more storage units of the storage device in the housing B is turned off, sending a command from the controller in the housing A to the housing B via the transmission path to lower an output of the cooling device in the housing B; and in response to the command from the controller in the housing A to lower the output, lowering the output of the cooling device in the housing B.

2. A method of controlling a storage apparatus according to claim 1, wherein each storage unit of the storage device in the housing B comprises one or more disks mounted on a disk drive, and wherein rotation of the one or more disks is stopped in the "power supply off" state.

3. A method of controlling a storage apparatus according to claim 1, wherein an average power consumption of the storage unit of the storage device in the housing B is zero in the "power supply off" state.

4. A method of controlling a storage apparatus according to claim 1, wherein the cooling device in the housing B comprises a fan, and wherein lowering the output of the cooling device in the housing B comprises lowering a speed of the fan.

5. A method of controlling a storage apparatus according to claim 1, further comprising monitoring, by the controller, an operating state of each storage unit of the storage device in the housing B to detect whether the storage unit is in the "power supply off" state.

6. A method of controlling a storage apparatus according to claim 1, wherein the command to lower the output contains information of how many storage units of the storage device in the housing B are in the "power supply off" state, and wherein the output of the cooling device in the housing B is adjustably lowered based on the information contained in the command to lower the output.

7. A method of controlling a storage apparatus according to claim 1, further comprising sending a command from the controller in the housing A via the transmission path to at least one storage unit in the housing B to change, from a "ready" operating state in which the storage unit can receive a command to read out or write data from or onto the storage unit, to a "not ready" operating state in which the storage unit cannot receive a command to read out or write data from or onto the storage unit.

8. A method of controlling a storage apparatus according to claim 7, wherein each storage unit of the storage device in the housing B comprises one or more disks mounted on a disk drive, and wherein rotational speed of the one or more disks is reduced in the "not ready" operating state.

9. A method of controlling a storage apparatus according to claim 7, wherein the at least one storage unit in the housing B changes from the "ready" operating state to the "not ready" operating state in response to the command from the controller in the housing A to change to the "not ready" operating state; and wherein at least one of the storage units of the storage device in the housing B is in the "not ready" operating state and remaining storage units of the storage device in the housing B are in the "power supply off" state.

10. A method of controlling a storage apparatus according to claim 9, further comprising turning off power supply of a cooling device in the housing A.

11. A method of controlling a storage apparatus according to claim 10, wherein at least one of the storage units of the storage device in the housing A is in the "power supply off" state and remaining storage units of the storage device in the housing A are not in the "power supply off" state; and further comprising transitioning the remaining storage units of the storage device in the housing A which are not in the "power supply off" state to the "power supply off" state by turning off power supply thereto.

12. A method of controlling a storage apparatus according to claim 1, further comprising, in response to an instruction to turn off a main switch of the storage apparatus, the controller starting a destaging process of unwritten data left in a cache memory of the storage apparatus.

13. A method of controlling a storage apparatus according to claim 12, further comprising, after the destaging process is completed, the controller in the housing A sending a command via the transmission path to at least one storage unit of the storage device in the housing A and at least one storage unit of the storage device in the housing B to transition to the "power supply off" state wherein power supply to the storage units in the "power supply off" state is turned off.

14. A method of controlling a storage apparatus according to claim 13, further comprising turning off the power supply to the storage units in the "power supply off" state in response to the command to transition to the "power supply off" state.

15. A method of controlling a storage apparatus, the storage apparatus including at least one housing A in which a storage device and a controller are provided, at least one housing B in which another storage device and a cooling device are provided, the storage device in the housing B including a plurality of storage units; and a transmission path connecting the storage device and the controller of the housing A and the storage device of the housing B to enable communication therebetween;

the method comprising:

in response to an instruction to turn off a main switch of the storage apparatus, the controller in the housing A sending a command via the transmission path to at least one storage unit of the storage device in the housing A and at least one storage unit of the storage device in the housing B to transition to the "power supply off" state wherein power supply to the storage units in the "power supply off" state is turned off;

turning off the power supply to the storage units in the "power supply off" state in response to the command to transition to the "power supply off" state;

sending a command from the controller in the housing A to the housing B via the transmission path to lower an output of the cooling device in the housing B; and in response to the command from the controller in the housing A to lower the output, lowering the output of the cooling device in the housing B.

16. A method of controlling a storage apparatus according to claim 15, further comprising, prior to sending the command to at least one storage unit of the storage device in the housing A and at least one storage unit of the storage device in the housing B to transition to the "power supply off" state, performing a destaging process of unwritten data left in a cache memory of the storage apparatus.

17. A method of controlling a storage apparatus according to claim 15, wherein the command to lower the output contains information of how many storage units of the storage device in the housing B are in the "power supply off" state, and wherein the output of the cooling device in the housing B is lowered based on the information contained in the command to lower the output.

18. A method of controlling a storage apparatus according to claim 15, further comprising sending a command from the controller in the housing A via the transmission path to at least one storage unit in the housing B to change, from a "ready" operating state in which the storage unit can receive a command to read out or write data from or onto the storage unit, to a "not ready" operating state in which the storage unit cannot receive a command to read out or write data from or onto the storage unit.

19. A method of controlling a storage apparatus according to claim 18, wherein the at least one storage unit in the housing B changes from the "ready" operating state to the "not ready" operating state in response to the command from the controller in the housing A to change to the "not ready" operating state;

wherein at least one of the storage units of the storage device in the housing B is in the "not ready" operating state and remaining storage units of the storage device in the housing B are in the "power supply off" state; and further comprising turning off power supply of a cooling device in the housing A.

20. A method of controlling a storage apparatus according to claim 19, wherein at least one of the storage units of the storage device in the housing A is in the "power supply off" state and remaining storage units of the storage device in the housing A are not in the "power supply off" state; and further comprising transitioning the remaining storage units of the storage device in the housing A which are not in the "power supply off" state to the "power supply off" state by turning off power supply thereto.

* * * * *